(12) United States Patent
Mann et al.

(10) Patent No.: US 6,926,465 B1
(45) Date of Patent: Aug. 9, 2005

(54) REMEDIATION SYSTEM

(76) Inventors: Michael J. Mann, 17702 Crystal Cove Pl., Lutz, FL (US) 33549-7945; James J. Hazen, 1550 Centennial Blvd., Bartow, FL (US) 33830

( * ) Notice: Subject to any disclaimer, the term of this patent is extended or adjusted under 35 U.S.C. 154(b) by 0 days.

(21) Appl. No.: 10/785,256

(22) Filed: Feb. 23, 2004

Related U.S. Application Data

(63) Continuation-in-part of application No. 10/336,405, filed on Jan. 3, 2003, now abandoned.

(51) Int. Cl.[7] .......................... B09C 1/02; B01D 21/01
(52) U.S. Cl. ..................... 405/128.45; 405/128.7; 405/128.75; 210/723; 588/256; 134/10; 134/84
(58) Field of Search ............... 405/128.1, 128.45, 405/128.5, 128.7, 128.75; 210/723, 195.1; 588/236, 256; 134/10, 13, 28, 29, 84

(56) References Cited

U.S. PATENT DOCUMENTS

| | | | | |
|---|---|---|---|---|
| 5,056,541 A | * | 10/1991 | Schade et al. | ................. 134/10 |
| 5,128,068 A | * | 7/1992 | Lahoda et al. | ............ 405/128.7 |
| 5,244,492 A | * | 9/1993 | Cyr | ........................ 405/128.75 |
| 5,266,494 A | * | 11/1993 | Lahoda et al. | ................. 134/10 |
| 5,268,128 A | * | 12/1993 | Lahoda et al. | ................. 588/20 |
| 5,316,223 A | * | 5/1994 | Lahoda et al. | ................. 209/18 |
| 5,372,650 A | * | 12/1994 | Lahoda et al. | ............. 134/25.1 |
| 5,795,285 A | * | 8/1998 | McLaughlin et al. | ........ 588/311 |
| 5,824,210 A | * | 10/1998 | Kuryluk | ......................... 209/3 |
| 5,843,315 A | * | 12/1998 | Baughn et al. | .............. 210/723 |
| 5,967,965 A | * | 10/1999 | Vyshkina et al. | ........... 588/256 |
| 6,010,624 A | * | 1/2000 | Larsen | ..................... 210/195.1 |
| 6,102,053 A | * | 8/2000 | Van De Steeg et al. | ... 134/25.1 |
| 6,258,018 B1 | * | 7/2001 | Pal et al. | ..................... 588/256 |

* cited by examiner

Primary Examiner—Jong-Suk (James) Lee
(74) Attorney, Agent, or Firm—Edward P. Dutkiewicz

(57) ABSTRACT

A remediation system comprises a primary scalping screen, a primary pump and sump, a large diameter maximum density separator with flocculant injection ring, a secondary pump and sump, a small diameter maximum density separator with flocculant injection ring, a static sieve screen, a flocculation sump, a vibrating screen, a dewatering device, a tertiary sump and pump, a secondary flocculation tank, and a pugmill. Screens move water and particulates through the components. In this manner larger particles are separated from smaller particles and the particles are further dewatered.

2 Claims, 2 Drawing Sheets

REMEDIATION SYSTEM

This application is a continuation-in-part of application Ser. No. 10/336,405 filed Jan. 3, 2003 entitled Remediation System, now abandoned.

FIELD OF THE INVENTION

This invention relates to soil and sediment remediation, remediation of mining tailings, and the treatment of chemical process sludges. This process utilizes a combination of screening, separation using hydrocyclones, sand dewatering, chemical flocculation, and fines dewatering on fixed and vibrating screens. This invention is unique because the fine-grained fraction can be dewatered to a dry solids concentration of greater than 40 percent without the use of pressure filtration equipment, and provides for a combined end-use product.

Contaminated soil and sediments are a serious problem worldwide. Most countries now have strong regulations that prohibit the development and use of properties with contaminated soil. When these properties are cleaned-up, commonly referred to as remediated, the handling of the soil for disposal or further use is central to the remediation activities.

Native soils, imported backfill, river and harbor sediments, and chemical/mining residuals display a distribution of particle sizes ranging from large debris, to gravel, to sands, silts, clays, and organic residues. The quantitation of this particle size distribution is defined in ASTM Method 422D. Particle size is very important in the selection of construction applications, and is equally important in selecting techniques to be used in soil remediation.

In remediation applications, it has been found that most environmental contaminants, including synthetic organics, heavy metals, and radioactive constituents frequently are concentrated in the fine-grained fractions of soils, namely the silts, clays, and organic residues. Thus, when the fine-grained fraction is physically separated from the larger soil fractions, the larger soil fractions often meet the applicable regulatory definitions of "clean". When this situation is identified, the total cost of remediation is greatly reduced since the cost of physical separation is much less than the disposal of the entire volume in a controlled, hazardous waste landfill or other disposal facility.

Physical separation of soil sediments and other process wastes can be efficiently performed using hydrocyclones. However, to make efficient separations with hydrocyclones, the soil/sediment/waste must be in a slurry of between approximately 10 and 15 percent dry solids. Thus, a significant volume of water must be used to prepare the slurry, and then be removed from the sand product and the fines product (often refered to as the "sludge cake".) The dewatering of the sand is routine and is covered in other patents. However, the dewatering of the fine-grained fraction is much more difficult. Numerous forms of fines dewatering equipment have been used for this task including belt filter presses, plate-and-frame filter presses, vacuum filter presses, and many modifications thereof.

This invention is unique because a process, defined herein, has been developed to use chemical flocculants to agglomerate the fine-grained particles into a larger molecular mass preparing the material to be dewatered on static and vibrating screens to produce a dewatered fine-grained product as good, or better, that the product from the filter press applications.

There is a need for a process which can separate fine-grained particles from coarser material and which produces a high solids concentration fines stream without expensive filtration equipment.

The objective of this invention is to provide a process for the physical separation and dewatering of the coarse and fine-grained products without the use of pressure filtration.

DESCRIPTION OF THE PRIOR ART

The use of particle separators of known designs and configurations is known in the prior art. More specifically, particle separators of known designs and configurations previously devised and utilized for the purpose of separating particles and removing water from soilids through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,843,315 5o Baughn et al. issued Dec. 1, 1998, discloses a system and method for recovering aggregate fine size particles. U.S. Pat. No. 5,967,965 to Vyshkina et al. issued Oct. 19, 1999, discloses a method for separating soil. U.S. Pat. No. 5,316,223 to Lahoda et al issued May 31, 1994, discloses a method and apparatus for cleaning contaminated particulate material. U.S. Pat. No. 5,056,541 to Schade et al. issued Oct. 15, 1991, discloses a method and apparatus for remediating soil. U.S. Pat. No. 5,637,154 to Shorthouse issued Jun. 10, 1997, discloses a method and apparatus for remediating soil. Finally, U.S. Pat. No. 4,841,998 to Bruya issued Jun. 27, 1989, discloses a soil decontamination method.

While these devices fulfill their respective, particular objectives and requirements, the aforementioned patents do not describe a remediation system that allows for separating larger particles from smaller particiles and dewater the resulting products.

In this respect, the remediation system according to the present invention substantially departs from the conventional concepts and designs of the prior art, and in doing so provides an apparatus primarily developed for the purpose of for separating larger particles from smaller particles and dewater the resulting products.

Therefore, it can be appreciated that there exists a continuing need for a new and improved remediation system which can be used for separating larger particles from smaller particiles and dewater the resulting products. In this regard, the present invention substantially fulfills this need.

SUMMARY OF THE INVENTION

In view of the foregoing disadvantages inherent in the known types of particle separators of known designs and configurations now present in the prior art, the present invention provides an improved remediation system. As such, the general purpose of the present invention, which will be described subsequently in greater detail, is to provide a new and improved remediation system and method which has all the advantages of the prior art and none of the disadvantages.

To attain this, the present invention is a remediation method and system for separating larger particles from smaller particles and dewatering the resulting products.

First provided is a primary scalping screen. The scalping screen has 1 inch openings. The scalping screen is adapted to receive a first stream. The first stream is comprised of a slurry of various sized particles and moisture. The primary scalping screen is further able to skim off a second stream. The second stream is comprised of particles greater than the openings in the scalping stream. The primary scalping screen allows a third stream to pass through. The third stream is comprised of particles that are less than the screen opening.

A primary sump and a primary pump are provided. The primary and sump and primary pump are adapted to receive the third stream by the flow of gravity and to output a fourth stream. Specialty flocculants may be injected at this time.

Next provided is a large diameter maximum density separator. The large diameter maximum density separator is provided to receive the fourth stream. The large diameter maximum density separator provided with a flocculant injection ring selects components of the fourth stream based upon site-specific nature. The large diameter maximum density separator discards a fifth stream. The fifth stream is comprised of a primary sand product. The output of the large diameter maximum density separator is a sixth stream. The sixth stream is comprised of particles greater than 40 to 75 micrometers and less than 1 inch.

A secondary sump and a secondary pump are provided. The secondary sump and the secondary sump are adapted to receive the sixth stream by the flow of gravity and to output a seventh stream.

A small diameter maximum density separator is provided. The small diameter maximum density separator is provided to receive the seventh stream. The small diameter maximum density separator selects components based upon the site-specific nature and discard an eighth stream. A flocculant injection ring may also be used on this separator. The eight stream is comprised of particles between about 20 and 40 micrometers in size. The output of the small diameter maximum density separator is fed to a ninth stream.

A static sieve screen is also provided. The static sieve screen is provided to receive the eighth stream by the flow of gravity. The static sieve screen removes the solids in a tenth stream. The static sieve screen has openings ranging from between 300 and 500 micrometers. The small particles that pass through the screen leave by the flow of gravity as an eleventh stream.

Also provided is a flocculation sump. The flocculation sump collects the ninth stream by the flow of gravity. The flocculation sump allows the flocculated material of the ninth stream to settle and clarified water to overflow from the secondary sump as a twelfth stream. The flocculation sump discharges a thirteenth stream by gravity. The thirteenth stream includes thickened solids.

A vibrating screen is provided. The vibrating screen has a high rotational speed and low amplitude. The vibrating screen is adapted to dewater the input. The vibrating screen is adapted to receive the tenth stream and the thirteenth stream. The output of the vibrating screen is adapted to include a fourteenth stream. The fourteen stream is strong with flocculated solids. The output of the vibrating screen is further adapted to include a fifteenth stream. The fifteen stream is adapted to include water extracted from the input streams.

A horizontal dewatering device is provided. The horizontal dewatering device consists of parallel polyurethane rollers. The rollers are in an enclosed collection box. The horizontal dewatering device is adapted to input the fourteenth stream and a nineteenth stream. The nineteen stream includes reagents to improve the quality of the output seventeenth output stream. This stream may be combined with the sand product (stream 5) and mixed in a pugmill to create a final product. The seventeenth output stream is the secondary product pile and consists of dewatered solids. The extracted water constitutes an output which is a sixteenth stream.

Further provided is a tertiary sump and a tertiary pump. The tertiary sump and tertiary pump collect the eleventh stream, fifteenth stream and sixteenth stream. The tertiary sump and tertiary pump further discharge the collected solids and water through an eighteenth stream.

Provided last is a secondary flocculation tank. The secondary flocculation tank receives an eighteenth stream whereat solids are extracted as needed and the outflow water is similar to the twelfth stream.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remediation system which has all of the advantages of the prior art particle separators of known designs and configurations and none of the disadvantages.

It is another object of the present invention to provide a new and improved remediation system which may be easily and efficiently manufactured and marketed.

It is further object of the present invention to provide a new and improved remediation system which is of durable and reliable constructions.

An even further object of the present invention is to provide a new and improved remediation system which is susceptible of a low cost of manufacture with regard to both materials and labor, and which accordingly is then susceptible of low prices of sale to the consuming public, thereby making such remediation system economically available to the buying public.

Even still another object of the present invention is to provide a remediation system for separating larger particles from smaller particles and dewater the resulting products.

Lastly, it is an object of the present invention to provide a remediation method and system comprising a primary sump and a primary pump, a secondary sump and a secondary pump, a small diameter maximum density separator, a static sieve screen, a flocculation sump, a vibrating screen, a dewatering device, a tertiary sump and a tertiary pump, a secondary flocculation tank, and screens to move water and particulates through the above listed components for separating larger particles from smaller particles and to dewater the particles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
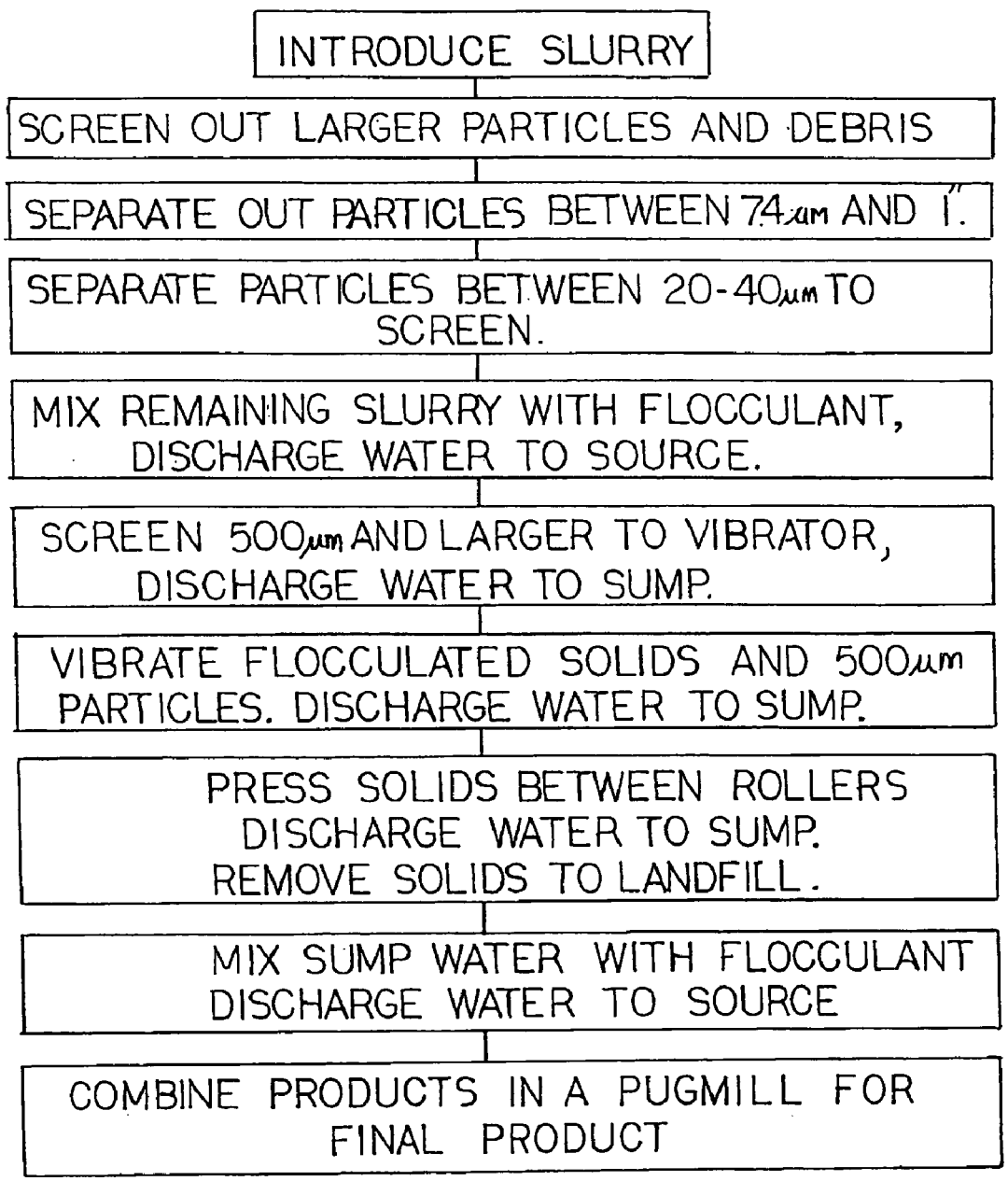
FIG. 1 is a flow diagram of the present inventions showing the steps of the method described herein.
Figure 2:
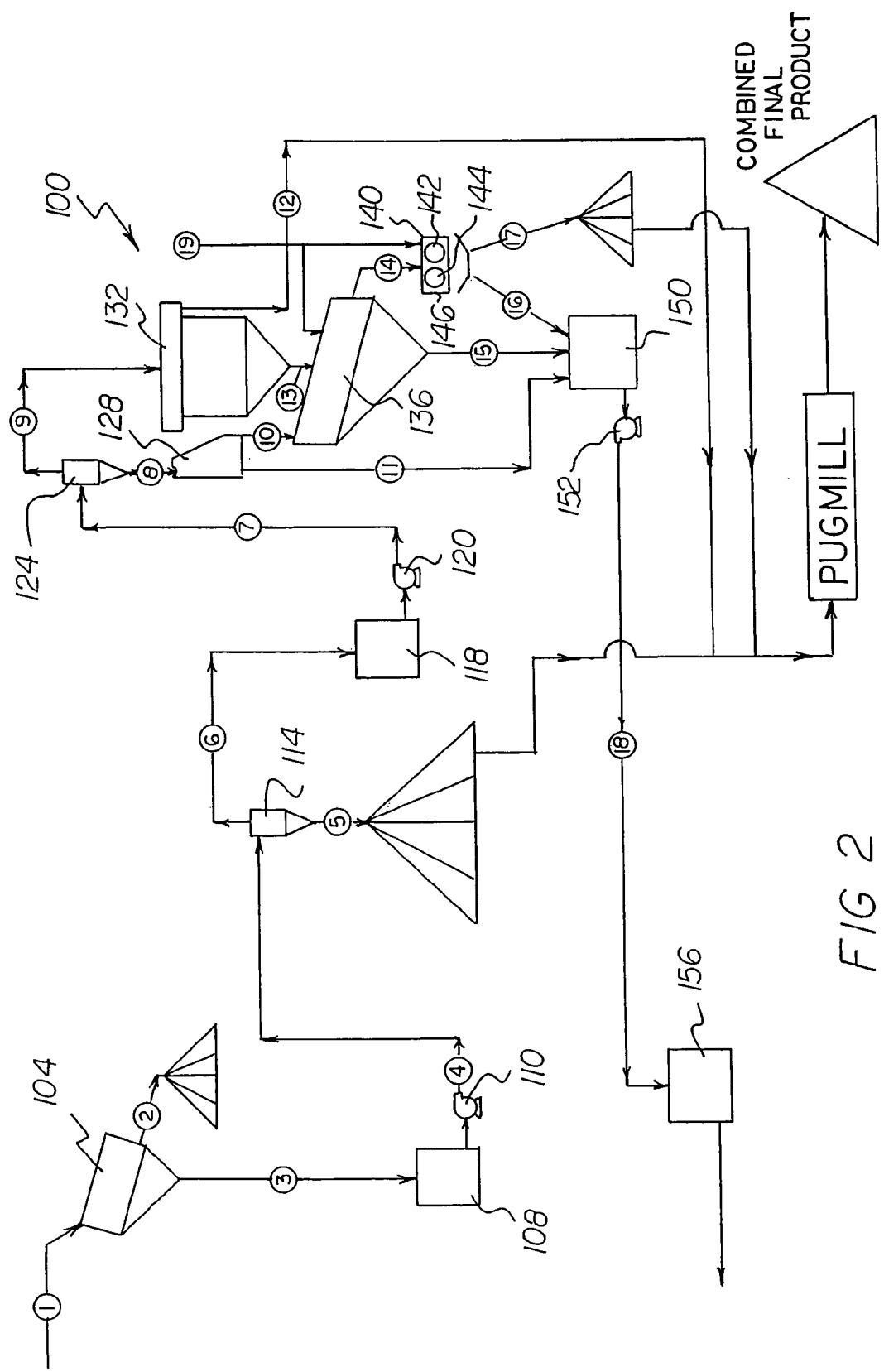
FIG. 2 is a block diagram of the present invention showing the components as described herein.

With reference now to the drawings, and in particular to FIG. 1 thereof, the preferred embodiment of the new and improved remediation system embodying the principles and concepts of the present invention and generally designated by the reference numeral 10 will be described.

The present invention, the remediation system 100 is comprised of a plurality of components. Such components in their broadest context include a primary scalping screen, a primary sump and a primary pump, a primary large diameter maximum density separator, a secondary sump and a secondary pump, a small diameter maximum density separator, a static sieve screen, a flocculation sump, a vibrating screen, a dewatering device, a tertiary sump and a tertiary pump, a secondary flocculation tank and screens.

First provided is a primary scalping screen 104. The scalping screen has 1 inch openings. The scalping screen is adapted to receive a first stream 1. The first stream is comprised of a slurry of various sized particles and moisture. The primary scalping screen is further able to skim off a second stream 2. The second stream is comprised of particles greater than the opening in th scalping screen. The primary scalping screen allows a third stream 3 to pass through. The third stream 3 is comprised of particles less than the opening in the scalping screen.

A primary sump 108 and a primary pump 110 are provided. The primary and sump and primary pump are adapted to receive the third stream 3 by the flow of gravity and to output a fourth stream 4. Flocculants may be injected near the discharge of the pump.

Next provided is a large diameter maximum density separator 114. The large diameter maximum density separator is provided to receive the fourth stream 4. The large diameter maximum density separator selects components of the fourth stream 4 based upon site-specific nature. The separator is provided with a flocculant injection ring to which selected flocculants are added. The large diameter maximum density separator discards a fifth stream 5. The firth stream is comprised of a primary sand product. The output of the large diameter maximum density separator is a sixth stream 6. The sixth stream is comprised of particles greater than 40 to 75 micrometers and less than 1 inch.

A secondary sump 118 and a secondary pump 120 are provided. The secondary sump and the secondary sump are adapted to receive the sixth stream 6 by the flow of gravity and to output a seventh stream 7.

A small diameter maximum density separator 124 is provided. The small diameter maximum density separator is provided to receive the seventh stream 7. This separator is also provided with a flocculant injection ring to which flocculants are added. The small diameter maximum density separator selects components based upon the site-specific nature and discard an eighth stream 8. The eight stream is comprised of particles between about 20 and 40 micrometers in size. The output of the small diameter maximum density separator is fed to a ninth stream 9.

A static sieve screen 128 is also provided. The static sieve screen is provided to receive the eighth stream 8 by the flow of gravity. The static sieve screen removes the solids in a tenth stream 10. The static sieve screen has openings ranging from between 300 and 500 micrometers. The small particles that pass through the screen leave by the flow of gravity as an eleventh stream 11.

Also provided is a flocculation sump 132. The flocculation sump collects the ninth stream 9 by the flow of gravity. The flocculation sump allows the flocculated material of the ninth stream 9 to settle and clarified water to overflow from the secondary sump as a twelfth stream 12. The flocculation sump discharges a thirteenth stream 13 by gravity. The thirteenth stream includes thickened solids.

A vibrating screen 136 is provided. The vibrating screen has a high rotational speed and low amplitude. The vibrating screen is adapted to dewater the input. The vibrating screen is adapted to receive the tenth stream 10 and the thirteenth stream 13. The output of the vibrating screen is adapted to include a fourteenth stream 14. The fourteen stream is strong with flocculated solids. The output of the vibrating screen is further adapted to include a fifteenth stream 15. The fifteen stream is adapted to include water extracted from the input streams.

A horizontal dewatering device 140 is provided. The horizontal dewatering device consists of parallel polyurethane rollers 142, 144. The rollers are in an enclosed collection box 146. The horizontal dewatering device is adapted to input the fourteenth stream 14 and a ninteenth stream 19. The nineteen stream includes reagents to improve the quality of the output seventeenth output stream 17. The seventeenth output stream is the secondary product pile and consists of dewatered solids. The extracted water constitutes an output which is a sixteenth stream 16.

The secondary product pipe stream 17 is combined with the primary product pile stream 5 and is fully mixed in the pugmill.

Further provided is a tertiary sump 150 and a tertiary pump 152. The tertiary sump and tertiary pump collect the eleventh stream 11, fifteenth stream 15 and sixteenth stream 16. The tertiary sump and tertiary pump further discharge the collected solids and water through an eighteenth stream 18.

Provided last is a secondary flocculation tank 156. The secondary flocculation tank receives an eighteenth stream 18 whereat solids are extracted as needed and the outflow water is similar to the twelfth stream 12.

The invention also include a method of remediating soils and sediments. First, the method includes the step of providing a primary slurry through a first stream 1 comprised of gravel, sand, silt, clay, organic matter and moisture.

Next, the method includes the step of provided a primary scalping screen 104 having 1 inch openings.

Next, the method includes the step of providing a primary sump 108 and a primary pump 110.

Next, the method includes the step of providing a large diameter maximum density separator 114 with flocculation injection ring.

Next, the method includes the step of providing a secondary sump 118 and a secondary pump 120.

Next, the method includes the step of providing a small diameter maximum density separator 124 with flocculation injection ring.

Next, the method includes the step of providing a static sieve screen 128.

Next, the method includes the step of providing a flocculation sump 132.

Next, the method includes the step of providing a vibrating screen 136 with a high rotational speed and low amplitude.

Next, the method includes the step of providing a horizontal dewatering device 140 consisting of two parallel polyurethane rollers 142, 144 in an enclosed collection box 146.

Next, the method includes the step of providing a tertiary sump 150 and a tertiary pump 152.

Next, the method includes the step of providing a secondary flocculation tank 156.

Next, the method includes the step of introducing the primary slurry into the primary scalping screen 104.

Next, the method includes screening out coarse particles from the primary slurry.

Next, the method includes the step of separating out particles between 40 micrometers and larger with the large diameter maximum density separator 114.

Next, the method includes the step of separating out particles between 20 and 40 micrometers with the small diameter maximum density separator.

Next, the method includes the step of mixing the remaining slurry with flocculant and discharging water.

Next, the method includes the step of screening 500 micrometer and larger particles to vibrator and discharging water with the static sieve screen 128.

Next, the method includes the step of vibrating flocculated solids and 500 micrometer particles and discharging the water to the tertiary sump 152 through the vibrating screen 136.

Next, the method includes the step of pressing solids between rollers 142, 144 and discharging water to the tertiary sump 150 and removing solids to a landfill through the horizontal dewatering device 140.

Finally, the method includes the step of mixing sump water with the flocculant discharge water and returning it to the source through the tertiary sump.

As can be understood from the foregoing and the Figures, Stream 1 is a slurry feed stream and represents the introduction of the material to be treated into the system. This feed stream is in the range of between about 10 and 20 percent dry solids (ds) and can be provided from a hydraulic dredge discharge or from a slurry preparation system in the case of uplands soils. Stream 1 is first direct to the primary scalping screen for the removal of coarse material and debris. This material is referred to as the oversize material and is the product of Stream 2. The screen deck on the primary scalping screen is selected based on-site specific considerations. The material less than the size of the screen opening falls through the screen and makes up Stream 3.

Stream 3, a slurry of approximately 10 and 20 percent density flows by gravity to the primary sump from which it is transferred by the primary pump with flocculant injection as Stream 4 to the inlet of the large diameter maximum density separator (MDS) cyclone/separator. The inlet pressure, the diameter of the MDS, and the internal components will be selected based upon the site-specific nature of the soil to be treated. Flocculants can be injected in the separator ring. The underflow of the MDS, Stream 5, results in the primary sand product. The separation point selected for the MDS will be project-specific, but the primary sand product will have a size distribution of approximately greater than 40 to 75 $\mu$m and less than 1 inch. Stream 6 is known as the overflow of the MDS and consists primarily of water and soil particles smaller than the selected separation point, nominally less than 40–75 $\mu$m. The MDS overflow flows by gravity to the secondary sump and is transferred by the secondary pump as Stream 7.

Stream 7 is pumped to the inlet of the small diameter maximum density separator (SmMDS) cyclone/separator. The inlet pressure, the diameter of the SmMDS, and the internal components will be selected based upon the site-specific nature of the soil to be treated. Flocculants can be injected in the separator ring. Stream 8 is the underflow of the SmMDS and consists of sand misplacement from the MDS and particles generally in the range of 20–40 $\mu$m. Stream 9 is the overflow of the SmMDS and consists of water and soil particles generally smaller than 20 to 40 $\mu$m. The material in Stream 9 represents the most difficult material to treat in this operation; it is this stream that has been traditionally dewatered with pressure filtration devices. Before operations begin, this stream is prepared and evaluated at the bench-scale level. The bench-scale testing quantifies the particle size distribution and the physical and chemical properties of this stream. Jar testing is performed to select a commercial flocculent, and the optimum dosage, which will coagulate and agglomerate these fine particles. The flocculant selected will be chosen on the basis of promoting a strong, dense product. The flocculant selected will also be chosen to have no deleterious environmental impacts as a residual in the soil products or discharge water streams. The selected flocculent, at the specified dosage, is injected into Stream 9 (injection stream not shown). Stream 9 discharges by gravity into the flocculation sump. In the flocculation sump, the flocculent, the soil particles, and the water are mixed and provided with the designed retention time.

Stream 8, the underflow of the SmMDS, is discharged and flows by gravity onto the static sieve screen. The purpose of the static sieve screen is to remove solids from Stream 8, and to discharge those solids as Stream 10 onto the vibrating screen. The size of the screen openings in the static sieve screen is in the range of 300 to 500 $\mu$m. The water and small particles that pass through the screen are discharged by gravity as Stream 11 and are collected in the tertiary sump.

As Stream 9 continues to discharge into the flocculation sump, the flocculated material settles and clarified water overflows from the sump as Stream 12. This water stream is discharged in accordance with site and local regulatory requirements.

The flocculated solids are thickened in the cone section of the flocculation sump. The thickened solids are discharged by gravity in Stream 13, and are placed with minimal impact energy, onto the vibrating screen. The vibrating screen has a high rotational speed and low amplitude. The screen opening is small and is intended to only allow water to pass through. The nominal size of this screen decking is in the range of 300 μm. The effective surface area of the screen is selected based upon the soil to be processed and the throughput rate required. The strong, flocculated solids are effectively dewatered on the vibrating screen and are discharged as Stream 14. The water passing through the screen decking is discharged by gravity to the tertiary sump as Stream 15.

Stream 14 is conveyed and discharges by gravity onto the horizontal dewatering device. The horizontal dewatering device is unit consisting of two parallel polyurethane rollers in an enclosed collection box. The dewatered, flocked solids are further dewatered as they are gently pressed between the counter rotating rollers. The water and the solids drop onto a screen under the dewatering device. The secondary product pile in Stream 17 consists of the dewatered solids, often refered to in pressure filtration applications as the sludge cake. This product has a dry solids concentration in the range of 35 to 50 and passes the USEPA Paint Filter Test, which is the basis for the acceptance criteria for most landfills or disposal facilities. Stream 16 is the water, which passes through the screen and is discharged by gravity to the tertiary sump.

The tertiary pump draws from the tertiary sump and discharges the collected solids and water via Stream 18 to the secondary flocculation tank. The selected flocculant is dosed to this tank. A very small mass of solids is expected in this stream. Nevertheless, the accumulated solids will be removed on a campaign, as needed basis, and disposed in accordance with the specific project plan. The overflow water from the secondary flocculation tank will be discharge in a manner similar to Stream 12.

Stream 19 provides the ability to add reagents and/or amendments to improve the product quality of Stream 17.

The primary sand product stream 5 and the secondary product stream 17 are combined and mixed in a pugmill to achieve the final product.

The purpose of this invention is to provide a process and system for the remediation of soils and sediments utilizing physical separation of gravel and sand from fine grained, silts, clays, and organic matter, and to dewater the products so that they are amenable for reuse or disposal. This invention is applicable to the remediation of soils or sediments.

It can be readily realized that a) invention provides for the physical separation of the primary sand product, b) the use of flocculants can be optimized to an extent that effective dewatering can be performed on a properly designed vibrating screen; c) the horizontal dewatering device provides a unique enhancement to the production of a well dewatered secondary product pile; and d) the process described herein provides a unique alternative to the tradition methods of pressure filtration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A remediation system for separating larger particles from smaller particles and dewatering the resulting products comprising, in combination:

a primary scalping screen adapted to receive a first stream comprised of a slurry of various sized particles and moisture, the primary scalping screen further being able to skim off a second stream comprised of particles greater than the screen opening, and the primary scalping screen allowing a third stream to pass through, the third stream comprised of particles less than the screen opening;

a primary sump and a primary pump being adapted to receive the third stream by the flow of gravity and to output a fourth stream;

a large diameter maximum density separator with flocculant injection ring to receive the fourth stream and select components of the fourth stream based upon site-specific nature and discard a fifth stream which is comprised of a primary sand product, the output of the large diameter maximum density separator being a sixth stream which is comprised of particles greater than 40 to 75 micrometers and less than the primary scalping screen opening;

a secondary sump and a secondary pump being adapted to receive the sixth stream by the flow of gravity and to output a seventh stream;

a small diameter maximum density separator with flocculent injection ring to receive the seventh stream and to select components based upon the site-specific nature and discard an eighth stream which is comprised of particles between about 20 and 40 micrometers in size, the output of the small diameter maximum density separator fed to a ninth stream;

a static sieve screen to receive the eighth stream by the flow of gravity and functioning to remove the solids in a tenth stream, the static sieve screen having openings ranging from between 300 and 500 micrometers, the small particles that pass through the screen leaving by the flow of gravity as an eleventh stream;

a flocculation sump to collect the ninth stream by the flow of gravity and allow the flocculated material of the ninth stream to settle and clarified water to overflow from the secondary sump as a twelfth stream and discharge a thirteenth stream by gravity, the thirteenth stream including thickened solids:

a vibrating screen with a high rotational speed and low amplitude adapted to dewater the input, the vibrating screen adapted to receive the tenth stream and the thirteenth stream, the output of the vibrating screen adapted to include a fourteenth stream which is strong with flocculated solids and to include a fifteenth stream adapted to include water extracted from the input streams;

a horizontal dewatering device consisting of two parallel polyurethane rollers in an enclosed collection box, the horizontal dewatering device being adapted to input the fourteenth stream and a nineteenth stream and to output a sixteenth stream and a seventeenth stream, the nineteenth stream including reagents to improve the quality of the output of the seventeenth output stream which is the secondary product pile and which consists of dewatered solids while the extracted water constitutes an output which is a sixteenth stream;

a tertiary sump and a tertiary pump to collect the eleventh stream, fifteenth stream and sixteenth stream and to discharge the collected solids and water through an eighteenth stream;

the fifth stream and the seventeenth stream being combined and mixed in a pugmill to produce the final product; and a secondary flocculation tank to receive an eighteenth stream whereat solids are extracted as needed and the outflow water is similar to the twelfth stream.

2. A method of remediating soils and sediments comprising:

provide a primary slurry through a first stream comprised of gravel, sand, silt, clay, organic matter and moisture;

providing next a primary scalping screen having 1 inch openings;

providing next a primary sump and a primary pump;

providing next a large diameter maximum density separator with an initial flocculant injection ring;

providing next a secondary sump and a secondary pump;

providing next a small diameter maximum density separator with a secondary flocculant injection ring;

providing next a static sieve screen;

providing next a flocculation sump;

providing next a vibrating screen with a high rotational speed and low amplitude;

providing next a horizontal dewatering device consisting of two parallel polyurethane rollers in an enclosed collection box;

providing next a tertiary sump and a tertiary pump;

providing a pugmill;

providing next a secondary flocculation tank;

introducing the primary slurry into the primary scalping screen;

screening out 1 inch and larger particles from the primary slurry;

separating out particles between 40 micrometers and 1 inch with the large diameter maximum density separator and injecting flocculants;

separating out particles between 20 and 40 micrometers with the small diameter maximum density separator and injecting flocculants;

mixing the remaining slurry with flocculant and discharging water;

screening 500 micrometer and larger particles to vibrator and discharging water with the static sieve screen;

vibrating flocculated solids and 500 micrometer particles and discharging the water to the tertiary sump through the vibrating screen;

pressing solids between rollers and discharging water to the tertiary sump and combining solids with the primary sand product in a pugmill; and mixing sump water with the flocculant discharge water and returning it to the source through the tertiary sump.

* * * * *